United States Patent
Babb et al.

(10) Patent No.: US 12,448,088 B2
(45) Date of Patent: Oct. 21, 2025

(54) PERSONAL WATERCRAFT CART ASSEMBLY

(71) Applicants: Andrea Babb, Dundee, OR (US); James McAlpine, Dundee, OR (US)

(72) Inventors: Andrea Babb, Dundee, OR (US); James McAlpine, Dundee, OR (US)

( * ) Notice: Subject to any disclaimer, the term of this patent is extended or adjusted under 35 U.S.C. 154(b) by 298 days.

(21) Appl. No.: 18/218,956

(22) Filed: Jul. 6, 2023

(65) Prior Publication Data

US 2025/0074553 A1    Mar. 6, 2025

(51) Int. Cl.

| | |
|---|---|
| B63B 32/87 | (2020.01) |
| B60P 3/10 | (2006.01) |
| B60Q 1/24 | (2006.01) |
| B62B 1/00 | (2006.01) |
| B62B 1/10 | (2006.01) |
| B62B 1/14 | (2006.01) |
| B62B 1/26 | (2006.01) |
| B63B 32/80 | (2020.01) |
| B63C 13/00 | (2006.01) |

(52) U.S. Cl.
CPC ............ *B63B 32/87* (2020.02); *B60P 3/1033* (2013.01); *B60Q 1/24* (2013.01); *B62B 1/26* (2013.01); *B63B 32/80* (2020.02); *B63C 13/00* (2013.01); *B62B 1/00* (2013.01); *B62B 1/008* (2013.01); *B62B 1/10* (2013.01); *B62B 1/14* (2013.01); *B62B 2202/40* (2013.01); *B62B 2202/403* (2013.01)

(58) Field of Classification Search
CPC ..... B62B 2202/403; B62B 1/008; B62B 1/00; B62B 1/14; B62B 1/10; B63C 13/00; B63B 32/87; B63B 32/80; B60P 3/1033
See application file for complete search history.

(56) References Cited

U.S. PATENT DOCUMENTS

| | | | | |
|---|---|---|---|---|
| 1,658,500 | A * | 2/1928 | Tewes | B63C 13/00 114/353 |
| 3,940,813 | A * | 3/1976 | Konstantinov | B63C 13/00 114/344 |
| 4,180,881 | A * | 1/1980 | Speranza | B63C 3/02 114/344 |
| 4,440,409 | A * | 4/1984 | Margison | B62B 5/0083 280/47.32 |
| 4,457,546 | A * | 7/1984 | Wiant | B62D 63/062 293/154 |

(Continued)

FOREIGN PATENT DOCUMENTS

WO    WO2016057451    4/2016

*Primary Examiner* — Emma K Frick

(57) ABSTRACT

A personal watercraft cart assembly includes a cart which includes a lower shell and an upper shell hingedly coupled to the lower shell such that the cart defines a hollow body when the upper shell is in a closed position on the lower shell. A pair of rollers is rotatably coupled to the cart for rolling the cart along a support surface. A pair of cradles is coupled to the upper shell to support a personal watercraft for transport the personal watercraft. The cart is comprised of a buoyant material to float behind the personal watercraft. A pair of straps is coupled to the upper shell for securing the personal watercraft on the cart. A light emitter is coupled to the cart to emit light outwardly from the cart thereby enhancing visibility of the cart in a darkened environment.

9 Claims, 5 Drawing Sheets

(56) References Cited

U.S. PATENT DOCUMENTS

| | | | |
|---|---|---|---|
| 5,114,165 A * | 5/1992 | Vogel | B62B 5/0083 |
| | | | D34/24 |
| 5,119,752 A * | 6/1992 | Doherty | B62B 19/00 |
| | | | 114/361 |
| 5,285,936 A * | 2/1994 | Matricardi, Jr. | B62B 1/12 |
| | | | 280/30 |
| 5,492,346 A * | 2/1996 | Stadler | B62B 1/20 |
| | | | 280/79.6 |
| 5,791,280 A * | 8/1998 | Egan | B63B 7/04 |
| | | | 114/361 |
| 6,142,491 A | 11/2000 | Darling, III | |
| 6,296,297 B1 * | 10/2001 | Barrow | B60P 3/341 |
| | | | 296/168 |
| 6,325,395 B1 * | 12/2001 | Frymoyer | B62B 5/06 |
| | | | 280/652 |
| 6,364,336 B1 | 4/2002 | Jenkins | |
| 6,662,743 B1 * | 12/2003 | Rolfe | B63B 7/04 |
| | | | 114/344 |
| 6,851,382 B2 * | 2/2005 | Carter | B60P 3/10 |
| | | | 114/344 |
| 7,823,906 B2 * | 11/2010 | Darling, III | A61G 1/0225 |
| | | | 280/651 |
| 8,302,986 B1 * | 11/2012 | Shilts | B63B 21/56 |
| | | | 280/414.1 |
| 8,465,031 B2 | 6/2013 | Coghill, Jr. | |
| D710,289 S | 8/2014 | Biron | |
| 8,910,584 B2 * | 12/2014 | Bengtzen | B63B 7/04 |
| | | | 114/344 |
| 8,910,956 B2 * | 12/2014 | Bengtzen | B62B 1/186 |
| | | | 280/30 |
| 9,403,471 B2 * | 8/2016 | Delorme | B63C 13/00 |
| 9,776,686 B2 * | 10/2017 | Sizemore | B63B 7/02 |
| D868,411 S | 11/2019 | Kowalski | |
| 10,513,283 B2 | 12/2019 | Griffith | |
| 11,198,459 B1 * | 12/2021 | Dudley | B62B 1/12 |
| 11,345,381 B2 * | 5/2022 | Thrasher | B62B 1/262 |
| 2018/0208279 A1 * | 7/2018 | Soren | B63B 32/87 |
| 2020/0369309 A1 * | 11/2020 | Nothern | B62B 3/10 |
| 2023/0093085 A1 * | 3/2023 | Djerassi, Sr. | B62B 1/208 |
| 2023/0219387 A1 * | 7/2023 | McPheeters | B60D 1/54 |
| | | | 280/407 |
| 2023/0356644 A1 * | 11/2023 | Weskamp | B62B 1/20 |
| 2025/0100647 A1 * | 3/2025 | Smith | B62K 27/003 |

* cited by examiner

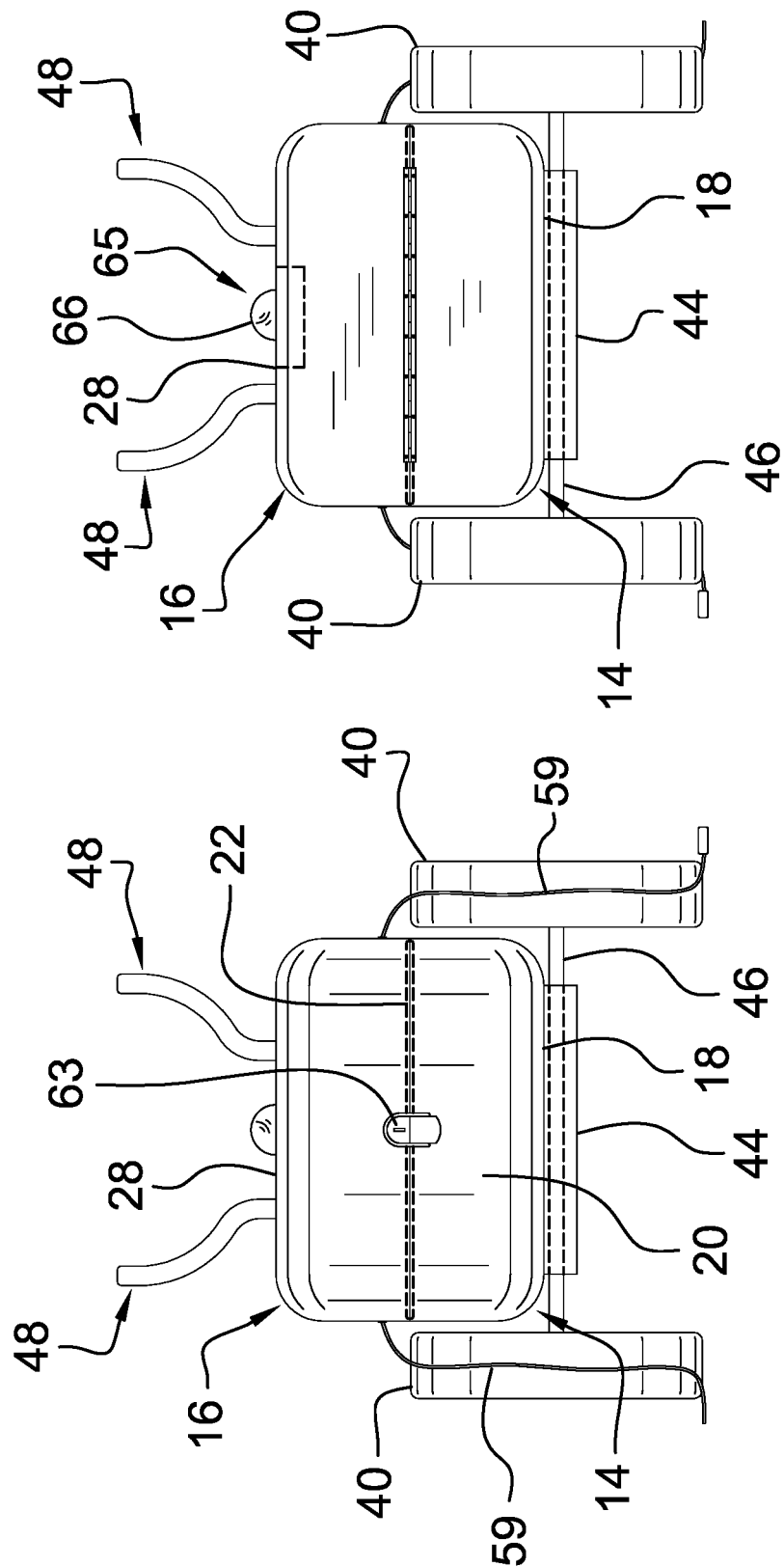

PERSONAL WATERCRAFT CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to watercraft cart device and more particularly pertains to a new watercraft cart device for transporting a personal watercraft to a launch site. The device includes a cart comprised of a lower shell hingedly coupled to an upper shell which is comprised of a buoyant material to float in water. A pair of cradles and a pair of straps is each attached to the cart for supporting a personal watercraft for transporting the personal watercraft to the launch site.

(2) Description of Related Art Including Information Disclosed Under 37 CFR 1.97 and 1.98

The prior art relates to watercraft cart devices including a variety of carts that each has structural elements for supporting a personal watercraft to transport the personal watercraft to a launch site. In no instance does the prior art disclose a cart for transporting a personal watercraft that comprises an upper shell hingedly coupled to a lower shell for forming a hollow body for containing personal belongings and which is comprised of a buoyant material for floating behind the personal watercraft.

BRIEF SUMMARY OF THE INVENTION

An embodiment of the disclosure meets the needs presented above by generally comprising a cart which includes a lower shell and an upper shell hingedly coupled to the lower shell such that the cart defines a hollow body when the upper shell is in a closed position on the lower shell. A pair of rollers is rotatably coupled to the cart for rolling the cart along a support surface. A pair of cradles is coupled to the upper shell to support a personal watercraft for transport the personal watercraft. The cart is comprised of a buoyant material to float behind the personal watercraft. A pair of straps is coupled to the upper shell for securing the personal watercraft on the cart. A light emitter is coupled to the cart to emit light outwardly from the cart thereby enhancing visibility of the cart in a darkened environment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a back view of an embodiment of the disclosure.

DETAILED DESCRIPTION OF THE INVENTION

Figure 1:
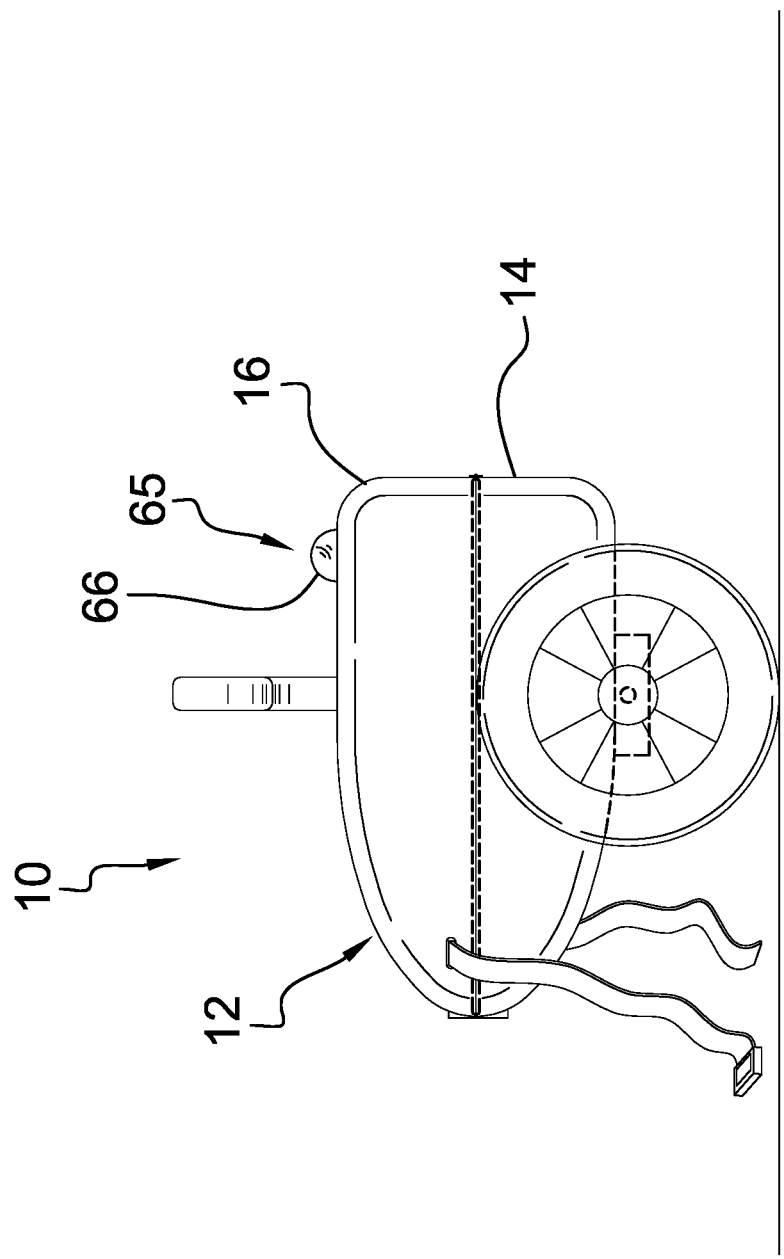
FIG. 1 is a left side view of a personal watercraft cart assembly according to an embodiment of the disclosure.
Figure 2:
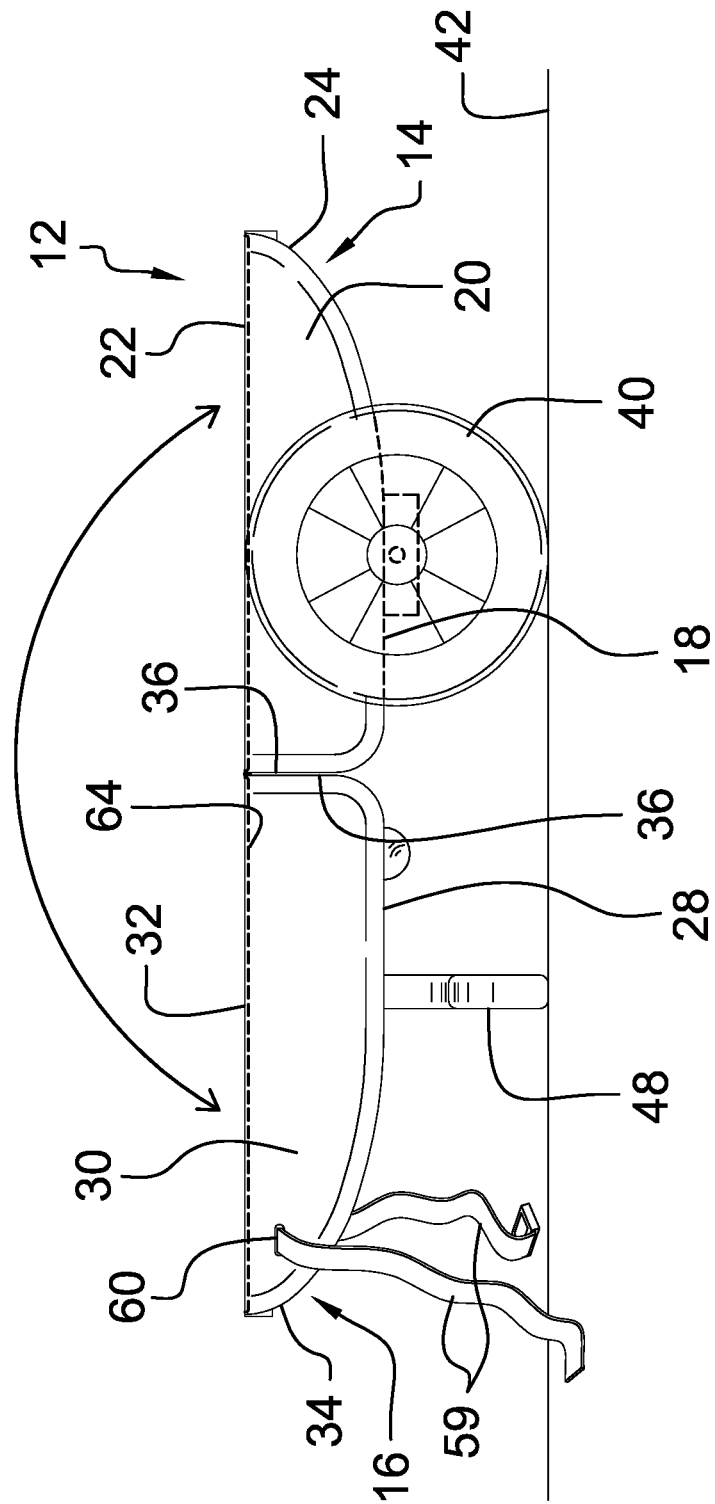
FIG. 2 is a left side view of an embodiment of the disclosure showing an upper shell in an open position.
Figure 5:
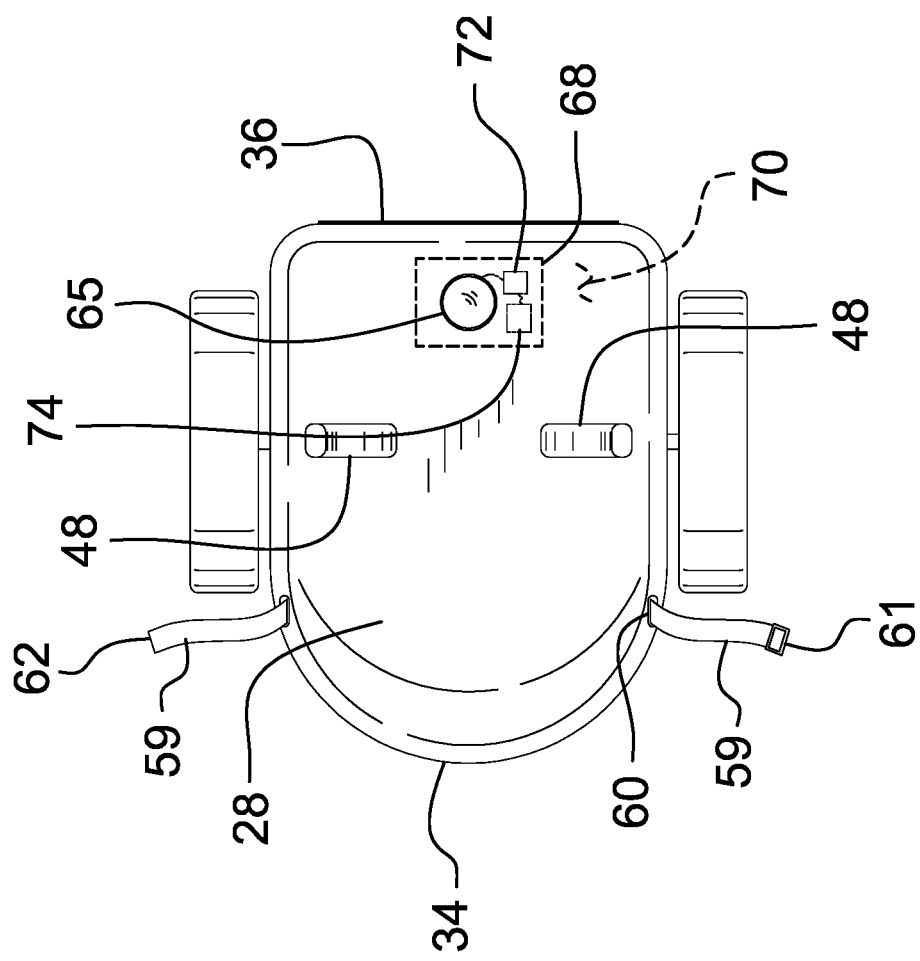
FIG. 5 is a top phantom view of an embodiment of the disclosure.
Figure 6:
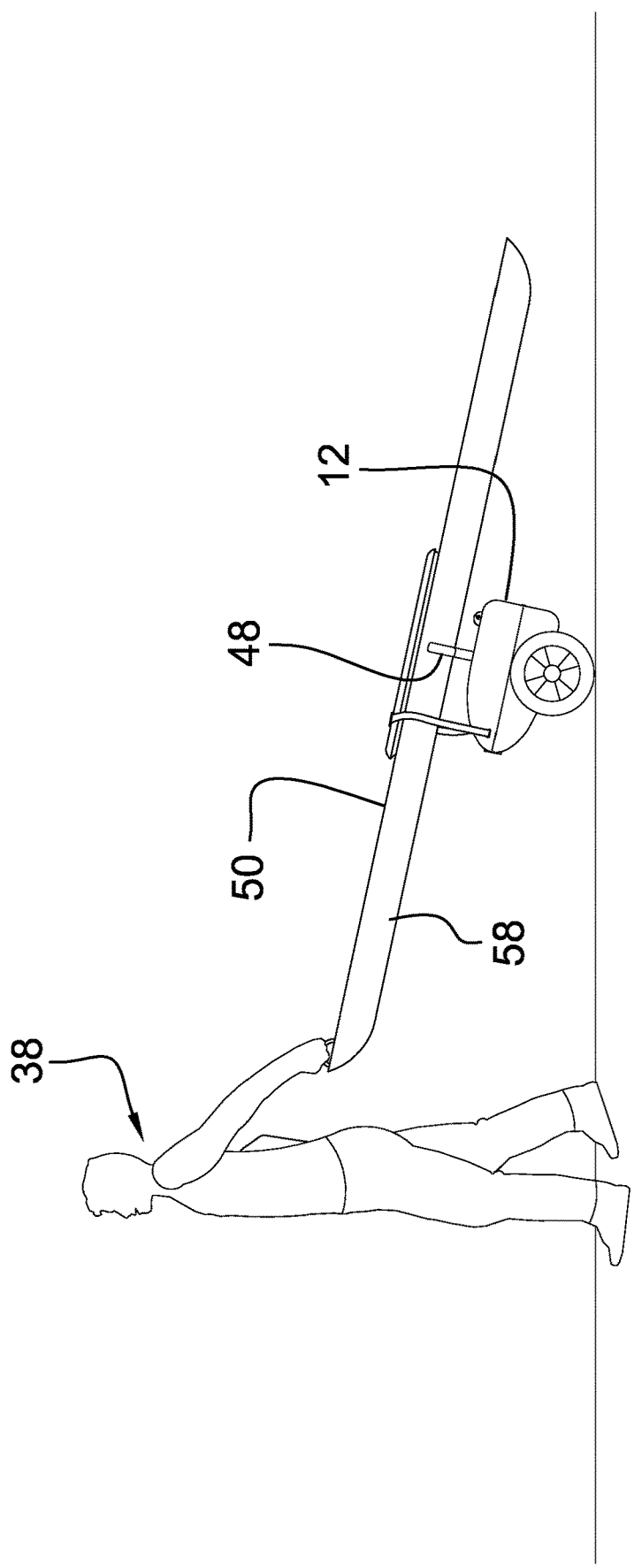
FIG. 6 is a perspective in-use view of an embodiment of the disclosure.

With reference now to the drawings, and in particular to FIGS. 1 through 6 thereof, a new watercraft cart device embodying the principles and concepts of an embodiment of the disclosure and generally designated by the reference numeral 10 will be described.

As best illustrated in FIGS. 1 through 6, the personal watercraft cart assembly 10 generally comprises a cart 12 which includes a lower shell 14 and an upper shell 16 that is hingedly coupled to the lower shell 14 such that the cart 12 defines a hollow body when the upper shell 16 is in a closed position on the lower shell 14. The lower shell 14 has a bottom wall 18 and an outer wall 20 curving between the bottom wall 18 and an upper edge 22 of the lower shell 14 such that the lower shell 14 defines a bowl shape. The outer wall 20 has a front end 24 that is rounded to a blunt point and the outer wall 20 has a back end 26 that is flattened to lie on a plane. The upper shell 16 has a top wall 28 and an exterior wall 30 curving between the top wall 28 and a lower edge 32 of the upper shell 16 such that the upper shell 16 defines a bowl shape. The exterior wall 30 has a forward end 34 that is rounded to a blunt point and the exterior wall 30 has a rear end 36 that is flattened to lie on a plane.

The lower edge 32 of the upper shell 16 corresponding to the rear end 36 of the exterior wall 30 is hingedly coupled to the upper edge 22 of the lower shell 14 corresponding to the back end 26 of the outer wall 20 of the lower shell 14. Furthermore, the lower edge 32 of the upper shell 16 lies on the upper edge 22 of the lower shell 14 when the upper shell 16 is positioned in the closed position. The upper shell 16 extends rearwardly from the lower shell 14 such that an interior of each of the upper shell 16 and the lower shell 14 is exposed with the upper shell 16 is in an open position. In this way a user 38 can place their personal belongings inside of the cart 12.

A pair of rollers 40 is rotatably coupled to the cart 12 to facilitate the cart 12 to be rolled along a support surface 42. Each of the rollers 40 may comprise a wheel that includes an inflatable tire to facilitate the rollers 40 to effectively roll along uneven terrain. An axle housing 44 is attached to the bottom wall 18 of the lower shell 14 and the axle housing 44 is oriented to extend laterally across the bottom wall 18. The axle housing 44 is positioned closer to the back end 26 of the outer wall 20 of the lower shell 14 than the front end 24 of the outer wall 20. An axle 46 is positioned within the axle housing 44 and each of a pair of ends of the axle 46 is attached to a hub of a respective one of the pair of rollers 40 such that each of the rollers 40 is spaced outwardly from the outer wall 20 of the lower shell 14.

A pair of cradles 48 is coupled to the upper shell 16 thereby facilitating the pair of cradles 48 to support a personal watercraft 50. In this way the cart 12 facilitates a user 38 to transport the personal watercraft 50. The personal watercraft 50 may be a kayak, a paddleboard or other type of personal watercraft 50 that is typically propelled by the user 38 with a paddle, for example. Each of the cradles 48 has a lower end 52 that is coupled to the top wall 28 of the upper shell 16. Additionally, each of the cradles 48 has a series of curves 54 extending between the lower end 52 and an upper end 56 of the cradles 48 such that each of the pair of cradles 48 has an S-shape. Each of the cradles 48 is positioned on opposite sides of a center of the top wall 28 having each of the cradles 48 curving away from each other thereby facilitating the pair of cradles 48 to conform to curvature of a hull 58 of the personal watercraft 50. As is most clearly shown in FIG. 2, each of the cradles 48 abuts the support surface 42 when the upper shell 16 is in the open position for supporting the upper shell 16.

Each of the upper shell 16 and the lower shell 14 is comprised of a buoyant material to facilitate the cart 12 to float behind the personal watercraft 50. In this way the user 38 does not have to leave their personal belongings unattended while the user 38 is on the personal watercraft 50. A pair of straps 59 is provided and each of the pair of straps 59 is coupled to the upper shell 16 thereby facilitating the pair of straps 59 to be extended over the personal watercraft 50. The pair of straps 59 is releasably matable to each other for securing the personal watercraft 50 on the cart 12. Each of the pair of straps 59 has a primary end 60 that is coupled to the exterior wall 30 of the upper shell 16 and each of the pair of straps 59 is positioned closer to the forward end 34 of the exterior wall 30 of the upper shell 16 than the pair of cradles 48. A buckle 61 is coupled to a secondary end 62 of a respective one of the pair of straps 59 and the buckle 61 releasably engages a secondary end 62 of an opposing one of the pair of straps 59 for retaining the pair of straps 59 around the personal watercraft 50.

A latch 63 is movably attached to the outer wall 20 of the lower shell 14 and the latch 63 is positioned on the front end 24 of the outer wall 20. The latch 63 releasably engages the forward end 34 of the exterior wall 30 of the upper shell 16 when the latch 63 is manipulated into a closing condition. A gasket 64 is applied to the upper edge 22 of the lower shell 14 having the gasket 64 extending fully around the upper edge 22. The lower edge 32 of the upper shell 16 compresses the gasket 64 when the upper shell 16 is in the closed position. The gasket 64 is comprised of a fluid impermeable material, including but not being limited to rubber or silicone, to inhibit water from entering the cart 12 when the upper shell 16 is in the closed position.

A light emitter 65 is coupled to the cart 12 to emit light outwardly from the cart 12 thereby enhancing visibility of the cart 12 in a darkened environment. The light emitter 65 is positioned on the top wall 28 of the upper shell 16 and the light emitter 65 is positioned closer to the rear end 36 of the exterior wall 30 than the pair of cradles 48. Additionally, the light emitter 65 includes a lens 66 that is disposed on the top wall 28 of the upper shell 16 and the light emitter 65 may comprise a light emitting diode or other type of electronic light emitter 65. An electronics housing 68 is attached to a bottom surface 70 of the top wall 28 of the upper shell 16 and the electronics housing 68 is aligned with the light emitter 65. A power button 72 is integrated into the electronics housing 68 and the power button 72 is electrically coupled to the light emitter 65 for turning the light emitter 65 on and off. A power supply 74 is positioned in the electronics housing 68; the power supply 74 is electrically coupled to the power button 72 and the power supply 74 comprises at least one battery.

In use, the user 38 places the personal belongings in the cart 12, the upper shell 16 is positioned in the closed position and the latch 63 is manipulated to retain the upper shell 16 in the closed position. The personal watercraft 50 is positioned in the pair of cradles 48 and the pair of straps 59 are secured around the personal watercraft 50 to secure the personal watercraft 50 on the cradles 48. In this way the user 38 can roll the personal watercraft 50 on the cart 12 to transport the personal watercraft 50 to a launch site. Upon launching the personal watercraft 50 the cart 12 can be towed behind the personal watercraft 50 due to the cart 12 being buoyant. In this way the user 38 does not have to leave either their personal belongings or the personal watercraft 50 unattended for any amount of time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A personal watercraft cart assembly for transporting a personal watercraft to a launch site which can be subsequently towed behind the personal watercraft in a body of water, said assembly comprising:
- a cart comprising a lower shell and an upper shell being hingedly coupled to said lower shell such that said cart defines a hollow body when said upper shell is in a closed position on said lower shell;
- a pair of rollers, each of said rollers being rotatably coupled to said cart wherein said pair of rollers is configured to facilitate said cart to be rolled along a support surface;
- a pair of cradles, each of said cradles being coupled to said upper shell thereby facilitating said pair of cradles to support a personal watercraft wherein said cart is configured to facilitate a user to transport said personal watercraft;
- wherein each of said upper shell and said lower shell is comprised of a buoyant material wherein said cart is configured to float behind said personal watercraft such that the user does not have to leave their personal belongings unattended while the user is on said personal watercraft;
- a pair of straps, each of said pair of straps being coupled to said upper shell thereby facilitating said pair of straps to be extended over said personal watercraft, said pair of straps being releasably matable to each other for securing said personal watercraft on said cart; and
- a light emitter being coupled to said cart wherein said light emitter is configured to emit light outwardly from said cart thereby enhancing visibility of said cart in a darkened environment.

2. The assembly according to claim 1, wherein:
- said lower shell has a bottom wall and an outer wall curving between said bottom wall and an upper edge of said lower shell such that said lower shell defines a bowl shape, said outer wall having a front end being rounded to a blunt point, said outer wall having a back end being flattened to lie on a plane;
- said upper shell has a top wall and an exterior wall curving between said top wall and a lower edge of said upper shell such that said upper shell defines a bowl shape, said exterior wall having a forward end being rounded to a blunt point, said exterior wall having a rear end being flattened to lie on a plane; and
- said lower edge of said upper shell corresponding to said rear end of said exterior wall is hingedly coupled to said upper edge of said lower shell corresponding to said back end of said outer wall of said lower shell, said lower edge of said upper shell lying on said upper edge of said lower shell when said upper shell is positioned in said closed position, said upper shell extending rearwardly from said lower shell such that an interior of each of said upper shell and said lower shell is exposed with said upper shell is in an open position wherein said lower shell is configured to receive personal belongings of a user.

3. The assembly according to claim 2, further comprising:
- an axle housing being attached to said bottom wall of said lower shell, said axle housing being oriented to extend laterally across said bottom wall, said axle housing being positioned closer to said back end of said outer wall of said lower shell than said front end of said outer wall; and
- an axle being positioned within said axle housing, each of a pair of ends of said axle being attached to a hub of a respective one of said pair of rollers such that each of said rollers is spaced outwardly from said outer wall of said lower shell.

4. The assembly according to claim 2, wherein each of said cradles has a lower end being coupled to said top wall of said upper shell, each of said cradles having a series of curves extending between said lower end and an upper end of said cradles such that each of said pair of cradles has an S-shape, said pair of cradles being positioned on opposite sides of a center of said top wall having each of said cradles curving away from each other thereby facilitating said pair of cradles to conform to curvature of a hull of said personal watercraft.

5. The assembly according to claim 2, wherein:
- each of said pair of straps has a primary end being coupled to said exterior wall of said upper shell, each of said pair of straps being positioned closer to said forward end of said exterior wall of said upper shell than said pair of cradles; and
- said assembly includes a buckle being coupled to a secondary end of a respective one of said pair of straps, said buckle releasably engaging a secondary end of an opposing one of said pair of straps for retaining said pair of straps around said personal watercraft.

6. The assembly according to claim 2, further comprising a latch being movably attached to said outer wall of said lower shell, said latch being positioned on said front end of said outer wall, said latch releasably engaging said forward end of said exterior wall of said upper shell when said latch is manipulated into a closing condition.

7. The assembly according to claim 2, further comprising a gasket being applied to said upper edge of said lower shell having said gasket extending fully around said upper edge, said lower edge of said upper shell compressing said gasket when said upper shell is in said closed position, said gasket being comprised of a fluid impermeable material wherein said gasket is configured to inhibit water from entering said cart when said upper shell is in said closed position.

8. The assembly according to claim 2, further comprising:
- an electronics housing being attached to a bottom surface of said top wall of said upper shell, said electronics housing being aligned with said light emitter;
- a power button being integrated into said electronics housing, said power button being electrically coupled to said light emitter for turning said light emitter on and off; and
- a power supply being positioned in said electronics housing, said power supply being electrically coupled to said power buttons, said power supply comprising at least one battery.

9. A personal watercraft cart assembly for transporting a personal watercraft to a launch site which can be subsequently towed behind the personal watercraft in a body of water, said assembly comprising:
- a cart comprising a lower shell and an upper shell being hingedly coupled to said lower shell such that said cart defines a hollow body when said upper shell is in a closed position on said lower shell, said lower shell having a bottom wall and an outer wall curving between said bottom wall and an upper edge of said lower shell such that said lower shell defines a bowl shape, said outer wall having a front end being rounded to a blunt point, said outer wall having a back end being flattened to lie on a plane, said upper shell having a top wall and an exterior wall curving between said top wall and a lower edge of said upper shell such that said upper shell defines a bowl shape, said exterior wall having a forward end being rounded to a blunt point, said exterior wall having a rear end being flattened to lie on a plane, said lower edge of said upper shell corresponding to said rear end of said exterior wall being hingedly coupled to said upper edge of said lower shell corresponding to said back end of said outer wall of said lower shell, said lower edge of said upper shell lying on said upper edge of said lower shell when said upper shell is positioned in said closed position, said upper shell extending rearwardly from said lower shell such that an interior of each of said upper shell and said lower shell is exposed with said upper shell is in an open position wherein said lower shell is configured to receive personal belongings of a user;

a pair of rollers, each of said rollers being rotatably coupled to said cart wherein said pair of rollers is configured to facilitate said cart to be rolled along a support surface;

an axle housing being attached to said bottom wall of said lower shell, said axle housing being oriented to extend laterally across said bottom wall, said axle housing being positioned closer to said back end of said outer wall of said lower shell than said front end of said outer wall;

an axle being positioned within said axle housing, each of a pair of ends of said axle being attached to a hub of a respective one of said pair of rollers such that each of said rollers is spaced outwardly from said outer wall of said lower shell;

a pair of cradles, each of said cradles being coupled to said upper shell thereby facilitating said pair of cradles to support a personal watercraft wherein said cart is configured to facilitate a user to transport said personal watercraft, each of said cradles having a lower end being coupled to said top wall of said upper shell, each of said cradles having a series of curves extending between said lower end and an upper end of said cradles such that each of said pair of cradles has an S-shape, said pair of cradles being positioned on opposite sides of a center of said top wall having each of said cradles curving away from each other thereby facilitating said pair of cradles to conform to curvature of a hull of said personal watercraft;

wherein each of said upper shell and said lower shell is comprised of a buoyant material wherein said cart is configured to float behind said personal watercraft such that the user does not have to leave their personal belongings unattended while the user is on said personal watercraft;

a pair of straps, each of said pair of straps being coupled to said upper shell thereby facilitating said pair of straps to be extended over said personal watercraft, said pair of straps being releasably matable to each other for securing said personal watercraft on said cart, each of said pair of straps having a primary end being coupled to said exterior wall of said upper shell, each of said pair of straps being positioned closer to said forward end of said exterior wall of said upper shell than said pair of cradles;

a buckle being coupled to a secondary end of a respective one of said pair of straps, said buckle releasably engaging a secondary end of an opposing one of said pair of straps for retaining said pair of straps around said personal watercraft;

a latch being movably attached to said outer wall of said lower shell, said latch being positioned on said front end of said outer wall, said latch releasably engaging said forward end of said exterior wall of said upper shell when said latch is manipulated into a closing condition;

a gasket being applied to said upper edge of said lower shell having said gasket extending fully around said upper edge, said lower edge of said upper shell compressing said gasket when said upper shell is in said closed position, said gasket being comprised of a fluid impermeable material wherein said gasket is configured to inhibit water from entering said cart when said upper shell is in said closed position;

a light emitter being coupled to said cart wherein said light emitter is configured to emit light outwardly from said cart thereby enhancing visibility of said cart in a darkened environment, said light emitter being positioned on said top wall of said upper shell, said light emitter being positioned closer to said rear end of said exterior wall than said pair of cradles, said light emitter including a lens being disposed on said top wall of said upper shell;

an electronics housing being attached to a bottom surface of said top wall of said upper shell, said electronics housing being aligned with said light emitter;

a power button being integrated into said electronics housing, said power button being electrically coupled to said light emitter for turning said light emitter on and off; and a power supply being positioned in said electronics housing, said power supply being electrically coupled to said power buttons, said power supply comprising at least one battery.

\* \* \* \* \*